United States Patent
Suh et al.

(10) Patent No.: US 9,233,421 B2
(45) Date of Patent: *Jan. 12, 2016

(54) METHOD FOR MANUFACTURING METALLIC NANOWIRES USING IONIC LIQUIDS

(75) Inventors: Kwang Suck Suh, Seongnam-si (KR); Jong Eun Kim, Seoul (KR); Tae Young Kim, Seoul (KR); Won Jung Kim, Seoul (KR)

(73) Assignee: Kwang Suck Suh, Bundang-Gu, Seongnam-Si, Gyeonggi-Do (KR)

( * ) Notice: Subject to any disclaimer, the term of this patent is extended or adjusted under 35 U.S.C. 154(b) by 220 days.

This patent is subject to a terminal disclaimer.

(21) Appl. No.: 13/130,045

(22) PCT Filed: Nov. 17, 2009

(86) PCT No.: PCT/KR2009/006767
§ 371 (c)(1),
(2), (4) Date: May 18, 2011

(87) PCT Pub. No.: WO2010/058941
PCT Pub. Date: May 27, 2010

(65) Prior Publication Data
US 2011/0219913 A1 Sep. 15, 2011

(30) Foreign Application Priority Data

Nov. 18, 2008 (KR) .................. 10-2008-0114906

(51) Int. Cl.
*B22F 9/24* (2006.01)
*B82Y 40/00* (2011.01)
*B22F 1/00* (2006.01)
*B82Y 30/00* (2011.01)

(52) U.S. Cl.
CPC ............... *B22F 9/24* (2013.01); *B22F 1/0025* (2013.01); *B82Y 30/00* (2013.01); *B22F 2009/245* (2013.01); *B22F 2301/255* (2013.01)

(58) Field of Classification Search
None
See application file for complete search history.

(56) References Cited

U.S. PATENT DOCUMENTS

| | | | |
|---|---|---|---|
| 7,247,723 B2 * | 7/2007 | Sahouani | 544/198 |
| 7,922,787 B2 * | 4/2011 | Wang et al. | 75/371 |
| 2007/0034052 A1 * | 2/2007 | Vanheusden et al. | 75/362 |
| 2008/0245186 A1 | 10/2008 | Yang et al. | |
| 2013/0160608 A1 * | 6/2013 | Nusko et al. | 75/370 |

FOREIGN PATENT DOCUMENTS

| JP | 2008-179836 A | 8/2008 |
|---|---|---|
| WO | WO2008/073143 A2 | 6/2008 |

OTHER PUBLICATIONS

Kwang S. Suh et al., "Ionic-Liquid-Assisted Formation of Silver Nanowires", Angew. Chem. Int. Ed., Apr. 16, 2009, pp. 3806-3809, vol. 48, Wiley-VCH Verlag GmbH & Co., Weinheim.

Younan Xia et al., "Uniform Silver Nanowires Synthesis by Reducing AgNO3 with Ethylene Glycol in the Presence of Seeds and Poly(Vinyl Pyrrolidone)", Chem. Mater., Oct. 8, 2002 pp. 4736-4745,vol. 14, American Chemical Society, Published on Web.

Yunsheng Ding et al., "Synthesis and characterization of carbon thin wires linked carbon hollow spheres encapsulating Ag nanoparticles", Science Direct, Mar. 4, 2008, pp. 3301-3304, vol. 62, Elsevier B.V.

Yugang Sun et al., "Crystalline Silver Nanowires by Soft Solution Processing", Nano Letters, Jan. 3, 2002, pp. 165-168, vol. 2, No. 2, American Chemical Society,published on web.

* cited by examiner

*Primary Examiner* — George Wyszomierski
(74) *Attorney, Agent, or Firm* — John K. Park; Park Law Firm

(57) ABSTRACT

Disclosed is a method of manufacturing nano-sized metal wire having a length-to-diameter ratio of at least 50 by using an ionic liquid in a polyol reduction using a metal salt as a precursor.

11 Claims, No Drawings

METHOD FOR MANUFACTURING METALLIC NANOWIRES USING IONIC LIQUIDS

TECHNICAL FIELD

The present invention relates to a method of manufacturing nano-sized metal wire, and more particularly to a method of uniformly manufacturing metal nanowire having a length-to-diameter ratio of at least 50 by using an ionic liquid in a polyol reduction using a metal salt as a precursor.

BACKGROUND ART

Recently, the demand for a transparent electrode in such fields as flat panel displays, touch panels, solar cells, etc. is increasing. The material for the transparent electrode which is currently being mainly used includes a metal oxide such as indium tin oxide (ITO) for vacuum deposition. However, because this metal oxide requires a post-treatment process at high temperature in order to exhibit high electrical conductivity, it is difficult to apply on a plastic substrate having comparatively low heat resistance. Even if a metal oxide film is formed on a plastic substrate through low-temperature deposition, problems of the metal oxide film easily cracking when faced with warping or other physical deformation may occur. Furthermore, vacuum deposition needs high production costs. Hence, thorough research into a transparent electrode material usable instead of the above material is being conducted.

Thus, there have been proposed methods of forming a transparent conductive film having high electrical conductivity and optical transparency by manufacturing a metal such as silver in the form of a nanostructure, dispersing the metal nanostructure in a solution and then applying the resulting dispersion solution on a plastic film. To this end, methods of simply manufacturing a metal nanostructure on a large scale using a solution are required, and the metal nanostructure should be provided in the form of wire having a high length-to-diameter ratio in order to form an effective conductive network. There have been recent reports about manufacturing metal nanowire from a metal salt precursor using a polyol such as ethyleneglycol as a reducing agent in the presence of polyvinylpyrrolidone (Chem. Mater. 14, 4736-4745). This technique is advantageous because the metal nanostructure is comparatively easily manufactured using a solution through the reaction, called "polyol reduction". Although the metal nanostructure thus manufactured may have the shape of nanowire, it may further have the shape of nanoparticles, in addition to the shape of nanowire, and also the shape of the nanostructure is difficult to reproducibly manufacture depending on the reaction conditions.

Therefore, in the manufacturing of the metal nanostructure, there is a need for a method of uniformly and reproducibly manufacturing a final product in the form of nanowire.

DISCLOSURE

Technical Problem

Accordingly, the present invention has been made keeping in mind the above problems encountered in the related art, and the present invention is intended to provide a method of uniformly and reproducibly manufacturing metal nanowire having a length-to-diameter ratio of at least 50 in a polyol reduction using a metal salt as a precursor. Other and further features and advantages of the invention will appear more fully from the following description.

Technical Solution

An aspect of the present invention provides a method of manufacturing metal nanowire by using an ionic liquid in a polyol reduction using a metal salt as a precursor.

In the present invention, a metal salt, a reducing solvent and an ionic liquid are mixed and allowed to react, so that a metal element produced from the metal salt by the polyol reduction interacts with the ionic liquid and is thus manufactured in the form of nanowire.

The metal salt is composed of a metal cation and an organic or inorganic anion, and examples thereof may include $AgNO_3$, $Ag(CH_3COO)_2$, $AgClO_4$, $Au(ClO_4)_3$, $PdCl_2$ and $PtCl_2$. This metal salt may be converted into the metal element, such as silver, gold, palladium or platinum through reduction.

The reducing solvent is a polar solvent able to dissolve the metal salt, that is, a solvent such as diol, polyol or glycol having two or more hydroxyl groups in the molecule thereof. Specific examples thereof include ethyleneglycol, 1,2-propyleneglycol, 1,3-propyleneglycol, glycerin and glycerol. The solvent for the polyol reduction functions to induce the reduction of the metal salt so as to produce the metal element.

The ionic liquid is a compound composed of an organic cation having an imidazolium group and an organic or inorganic anion, and may include a monomeric ionic liquid represented by Formula 1 below or a polymeric ionic liquid represented by Formula 2 below.

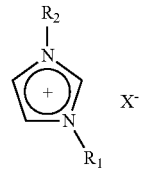

Formula 1

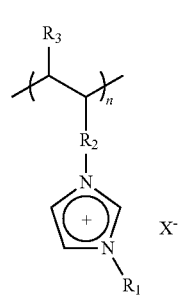

Formula 2

In Formulas 1 and 2, $R_1$, $R_2$ and $R_3$, which are the same as or different from each other, each are hydrogen or a $C_{1\sim16}$ hydrocarbon group, which may contain a heteroatom. Also, $X^-$ is an anion of the ionic liquid.

Specific examples of the cation of the monomeric ionic liquid represented by Formula 1 may include 1,3-dimethylimidazolium, 1,3-diethylimidazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-dodecyl-3-methylimidazolium and 1-tetradecyl-3-methylimidazolium, and specific examples of the cation of the polymeric ionic liquid represented by Formula 2 may include poly(1-vinyl-3-alkylimidazolium), poly(1-allyl-3-alkylimidazolium) and poly(1-(meth)acryloyloxy- 3-alkylimidazolium). The anion of the ionic liquid of Formula 1 or 2 is not particularly limited so long as it satisfies an ionic liquid, and examples thereof may include $Br^-$, $Cl^-$, $I^-$, $BF_4^-$, $PF_6^-$, $ClO_4^-$, $NO_3^-$, $AlCl_4^-$, $Al_2Cl_7^-$, $ASF_6^-$, $SbF_6^-$, $CH_3COO^-$, $CF_3COO^-$, $CH_3SO_3^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$ and $(CF_3SO_2)(CF_3CO)N^-$.

The ionic liquid may include any type of ionic liquid having physical and chemical properties varying depending on the combination of cation and anion. Particularly useful is an ionic liquid having high compatibility with the metal salt and the reducing solvent in order to manufacture the metal nanostructure in wire form. The ionic liquid chemically interacts with the metal ion or metal element when the metal salt is converted into the metal element by the polyol reduction, so that the metal element primarily grows, resulting in metal nanowire having a uniform shape.

In the method of manufacturing the metal nanowire according to the present invention, the metal salt, the reducing solvent and the ionic liquid are first mixed at an appropriate ratio and stirred at room temperature for a predetermined period of time. After homogeneously mixing the above components, the resulting mixture is heated to 150~200° C. so that the reaction continues, thereby manufacturing the metal nanowire. Accordingly, the metal nanostructure thus manufactured includes almost no nanoparticles, and has a shape of nanowire having an average diameter of 0.01~0.1 μm and an average length of 5~100 μm. In order to shape the nanowire in the above procedure, the mixing ratio of respective components should be appropriately controlled. Specifically, the metal salt and the ionic liquid may be respectively used at 0.01~1 M and 0.01~1 M with respect to the reducing solvent. In particular, when the ionic liquid is embodied as the polymeric ionic liquid, the polymeric ionic liquid may be used at 0.01~1 M based on a repeating unit.

Furthermore, in the method of manufacturing the metal nanowire according to the present invention, the metal salt, the reducing solvent and the ionic liquid may be additionally mixed with an ionic additive such as a quaternary ammonium salt.

Also, in order to prevent the formation of nanowire bundles and to reduce the diameter of nanowire, a dispersant may be further added. The kind of dispersant is not limited and includes for example Triton X-100, Triton X-200, products available from BASF such as P123, F127, F68, L64 and methyl-β-cyclodextrin, methylcellulose, ethylcellulose, polyvinylpyrrolidone, cetyltrimethylammonium bromide (CTAB), sodium dodecylsulfate (SDS), polystyrenesulfonate (PSSA), poly(sodium-4-styrenesulfonate) (PSSNa), and dodecylbenzenesulfonate (DBSA), which may be used alone or in combinations of two or more and may be added in an amount of 0.1~100 wt % based on the weight of the metal salt.

Advantageous Effects

The method according to the present invention enables the uniform and reproducible manufacture of metal nanowire having a length-to-diameter ratio of at least 50 in a polyol reduction using a metal salt as a precursor. Even when the metal nanowire thus manufactured is used in a small amount, it is capable of forming an effective conductive network and is thus adapted for use as a material for a transparent electrode.

MODE FOR INVENTION

A better understanding of the present invention may be obtained through the following examples, which are set forth to illustrate, but are not to be construed to limit the present invention.

Example 1

In a round-bottom flask, 50 g of a solution of 0.1 M $AgNO_3$ in ethyleneglycol was mixed with 50 ml of a solution of 0.15 M 1-butyl-3-methylimidazolium methylsulfate in ethyleneglycol. This mixture solution was allowed to react through stirring at 160° C. for 60 min, and then cooled to room temperature. The reaction solution was filtered using a filter having a pore size of 1 μm, and then observed using an electron scanning microscope. As a result, the nanowire having a diameter of about 120 nm and a length of about 7 μm could be seen to be formed.

Example 2

In a round-bottom flask, 10 ml of a solution of 0.2 M $AgNO_3$ in 1,3-propyleneglycol was mixed with 10 ml of a solution of 0.3 M 1-ethyl-3-methylimidazolium methylsulfate in 1,3-propyleneglycol. This mixture solution was allowed to react through stirring at 100° C. for about 30 min, and then cooled to room temperature. The reaction solution was filtered using a filter having a pore size of 1 μm, and then observed using an electron scanning microscope. As a result, the nanowire having a diameter of about 80 nm and a length of about 10 μm could be seen to be formed.

Example 3

In a round-bottom flask, 10 ml of a solution of 0.2 M $AgNO_3$ in 1,2-propyleneglycol was mixed with 10 ml of a solution of 0.3 M 1-ethyl-3-methylimidazolium methylsulfate in 1,3-propyleneglycol, after which sodium dodecylsulfate was added in an amount of 1 wt % based on the weight of added $AgNO_3$. This mixture solution was allowed to react through stirring at 100° C. for about 30 min, and then cooled to room temperature. The reaction solution was filtered using a filter having a pore size of 1 μm, and then observed using an electron scanning microscope. As a result, the nanowire having a diameter of about 40 nm and a length of about 10 μm could be seen to be formed.

INDUSTRIAL APPLICABILITY

According to the present invention, the manufactured metal nanowire can be used as a material for a transparent electrode in such fields as flat panel displays, touch panels, solar cells, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing metal nanowire, comprising:

mixing a metal salt, an ionic liquid and a reducing solvent and allowing them to react, so that a metal element produced from the metal salt by a polyol reduction interacts with the ionic liquid and thus is manufactured in nanowire form, wherein the ionic liquid is a compound composed of an organic cation having an imidazolium group and an organic or inorganic anion, and is selected from the group consisting of a monomeric ionic liquid represented by Formula 1 below and a polymeric ionic liquid represented by Formula 2 below:

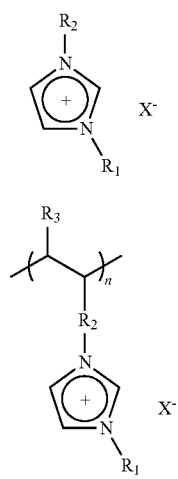

Formula 1

Formula 2 wherein $R_1$, $R_2$ and $R_3$, which are same as or different from each other, each are hydrogen or a $C_{1-16}$ hydrocarbon group, which contains a heteroatom, and $X^-$ is an anion of the ionic liquid, wherein the monomeric ionic liquid comprises either or both of a cation and an anion, the cation being selected from the group consisting of 1,3-dimethylimidazolium, 1,3-diethylimidazolium, 1-ethyl-3-methylimidazolium, 1-butyl-3-methylimidazolium, 1-hexyl-3-methylimidazolium, 1-octyl-3-methylimidazolium, 1-decyl-3-methylimidazolium, 1-dodecyl-3-methylimidazolium and 1-tetradecyl-3-methylimidazolium, and the anion being methylsulfate, wherein the polymeric ionic liquid comprises either or both of a cation and an anion, the cation being selected from the group consisting of poly(1-vinyl-3-alkylimidazolium), poly(1-allyl-3-alkylimidazolium) and poly(1-(meth)acryloyloxy-3-alkylimidazolium), and the anion being methylsulfate, and wherein the metal nanowire has a length-to-diameter ratio of at least 50.

2. The method according to claim 1, wherein the metal salt is composed of a metal cation and an organic or inorganic anion, and is selected from the group consisting of $AgNO_3$, $Ag(CH_3COO)_2$, $AgClO_4$, $Au(ClO_4)_3$, $PdCl_2$ and $PtCl_2$.

3. The method according to claim 2, wherein the reducing solvent is a solvent including diol, polyol or glycol having two or more hydroxyl groups in a molecule thereof, and is selected from the group consisting of ethyleneglycol, 1,2-propyleneglycol, 1,3-propyleneglycol, glycerin and glycerol.

4. The method according to claim 2, before the reacting, further mixing a dispersant selected from the group consisting of P123, F127, F68, L64, methyl-β-cyclodextrin, methylcellulose, ethylcellulose, polyvinylpyrrolidone, cetyltrimethylammonium bromide (CTAB), sodium dodecylsulfate (SDS), polystyrenesulfonate (PSSA), poly(sodium-4-styrenesulfonate) (PSSNa) and dodecylbenzenesulfonate (DBSA).

5. The method according to claim 2, wherein the mixing the metal salt, the ionic liquid and the reducing solvent is performed by respectively using the metal salt and the ionic liquid at 0.01~1 M and 0.01~1 M with respect to the reducing solvent, in which when the ionic liquid is embodied as the polymeric ionic liquid, the polymeric ionic liquid is used at 0.01~1 M based on a repeating unit.

6. The method according to claim 1, wherein the reducing solvent is a solvent including diol, polyol or glycol having two or more hydroxyl groups in a molecule thereof, and is selected from the group consisting of ethyleneglycol, 1,2-propyleneglycol, 1,3-propyleneglycol, glycerin and glycerol.

7. The method according to claim 6, before the reacting, further mixing a dispersant selected from the group consisting of P123, F127, F68, L64, methyl-β-cyclodextrin, methylcellulose, ethylcellulose, polyvinylpyrrolidone, cetyltrimethylammonium bromide (CTAB), sodium dodecylsulfate (SDS), polystyrenesulfonate (PSSA), poly(sodium-4-styrenesulfonate) (PSSNa) and dodecylbenzenesulfonate (DBSA).

8. The method according to claim 6, wherein the mixing the metal salt, the ionic liquid and the reducing solvent is performed by respectively using the metal salt and the ionic liquid at 0.01~1 M and 0.01~1 M with respect to the reducing solvent, in which when the ionic liquid is embodied as the polymeric ionic liquid, the polymeric ionic liquid is used at 0.01~1 M based on a repeating unit.

9. The method according to claim 1, before the reacting, further mixing a dispersant selected from the group consisting of P123, F127, F68, L64, methyl-β-cyclodextrin, methylcellulose, ethylcellulose, polyvinylpyrrolidone, cetyltrimethylammonium bromide (CTAB), sodium dodecylsulfate (SDS), polystyrenesulfonate (PSSA), poly(sodium-4-styrenesulfonate) (PSSNa) and dodecylbenzenesulfonate (DBSA).

10. The method according to claim 9, wherein the mixing the metal salt, the ionic liquid and the reducing solvent is performed by respectively using the metal salt and the ionic liquid at 0.01~1 M and 0.01~1 M with respect to the reducing solvent, in which when the ionic liquid is embodied as the polymeric ionic liquid, the polymeric ionic liquid is used at 0.01~1 M based on a repeating unit.

11. The method according to claim 1, wherein the mixing the metal salt, the ionic liquid and the reducing solvent is performed by respectively using the metal salt and the ionic liquid at 0.01~1 M and 0.01~1 M with respect to the reducing solvent, in which when the ionic liquid is embodied as the polymeric ionic liquid, the polymeric ionic liquid is used at 0.01~1 M based on a repeating unit.

* * * * *